United States Patent
Eleazar

(10) Patent No.: US 9,676,241 B2
(45) Date of Patent: Jun. 13, 2017

(54) SUSPENSION CONTROL ARM WITH FRANGIBLE BUSHING COLLAR

(71) Applicant: TOYOTA MOTOR ENGINEERING & MANUFACTURING NORTH AMERICA, INC., Erlanger, KY (US)

(72) Inventor: Andrew J. Eleazar, York Township, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/832,869

(22) Filed: Aug. 21, 2015

(65) Prior Publication Data

US 2017/0050485 A1    Feb. 23, 2017

(51) Int. Cl.
*B60G 7/00*    (2006.01)

(52) U.S. Cl.
CPC ...... *B60G 7/001* (2013.01); *B60G 2200/1424* (2013.01); *B60G 2200/154* (2013.01); *B60G 2204/1431* (2013.01); *B60G 2204/41* (2013.01); *B60G 2204/43* (2013.01)

(58) Field of Classification Search
CPC ............................................... B60G 2206/016
See application file for complete search history.

(56) References Cited

U.S. PATENT DOCUMENTS

| 4,334,693 A | 6/1982 | Huber |
| 5,607,177 A | 3/1997 | Kato |
| 6,298,962 B1 | 10/2001 | Kato et al. |
| 6,994,374 B2 * | 2/2006 | Miyasaka ............... B60G 7/02 280/784 |
| 7,703,782 B2 * | 4/2010 | Kiselis .................. B60G 7/001 280/124.133 |
| 8,459,674 B2 | 6/2013 | Mielke et al. |
| 8,646,793 B1 * | 2/2014 | Lam ........................ B60G 3/06 280/124.134 |
| 8,651,504 B2 | 2/2014 | Gerhards et al. |
| 8,857,555 B2 * | 10/2014 | Paintmayer ............. B60G 7/02 180/274 |

(Continued)

FOREIGN PATENT DOCUMENTS

| DE | 10 2013 202 792 A1 | 8/2014 | |
| ES | WO 2005005180 A1 * | 1/2005 | ............. B60G 7/001 |

(Continued)

*Primary Examiner* — Darlene P Condra
(74) *Attorney, Agent, or Firm* — Oblon, McClelland, Maier & Neustadt, L.L.P.

(57) ABSTRACT

A suspension arm adapted for use in a suspension system of an automotive vehicle including an arm member, a first mounting portion formed at a first end of the arm member and a second mounting portion formed at a second end of the arm member spaced in a first direction relative to the first mounting portion. The first mounting portion including a bushing collar equipped with a frangible portion comprising at least one stress riser, and the longitudinal axis of the collar in the first direction. By adding a frangible feature to the bushing collar of the suspension arm, the breakage mode and breakage timing can be optimized to ensure a tire-and-wheel assembly consistently contacts surrounding parts at the desired time and locations in a predictable sequence and manner during a vehicle impact event.

2 Claims, 3 Drawing Sheets

(56) References Cited

U.S. PATENT DOCUMENTS

| | | | | |
|---|---|---|---|---|
| 8,870,205 B2* | 10/2014 | Corby | ............... | B60G 3/06 |
| | | | | 180/274 |
| 8,979,082 B2* | 3/2015 | Makino | ............ | B60G 7/001 |
| | | | | 267/140.12 |
| 9,022,403 B2* | 5/2015 | Lam | ............ | B60G 7/02 |
| | | | | 280/124.1 |
| 9,115,778 B2* | 8/2015 | Wagner | ............ | B60G 11/08 |
| 9,168,958 B2* | 10/2015 | Kim | ............ | B62D 25/082 |
| 2006/0151970 A1* | 7/2006 | Kaminski | ............ | B60G 3/06 |
| | | | | 280/124.134 |
| 2016/0107495 A1* | 4/2016 | Spielmann | ............ | B60G 9/003 |
| | | | | 280/124.128 |

FOREIGN PATENT DOCUMENTS

| | | |
|---|---|---|
| JP | 3-61105 A | 3/1991 |
| JP | 2003-300405 A | 10/2003 |

\* cited by examiner

Front of Vehicle →

← Front of Vehicle

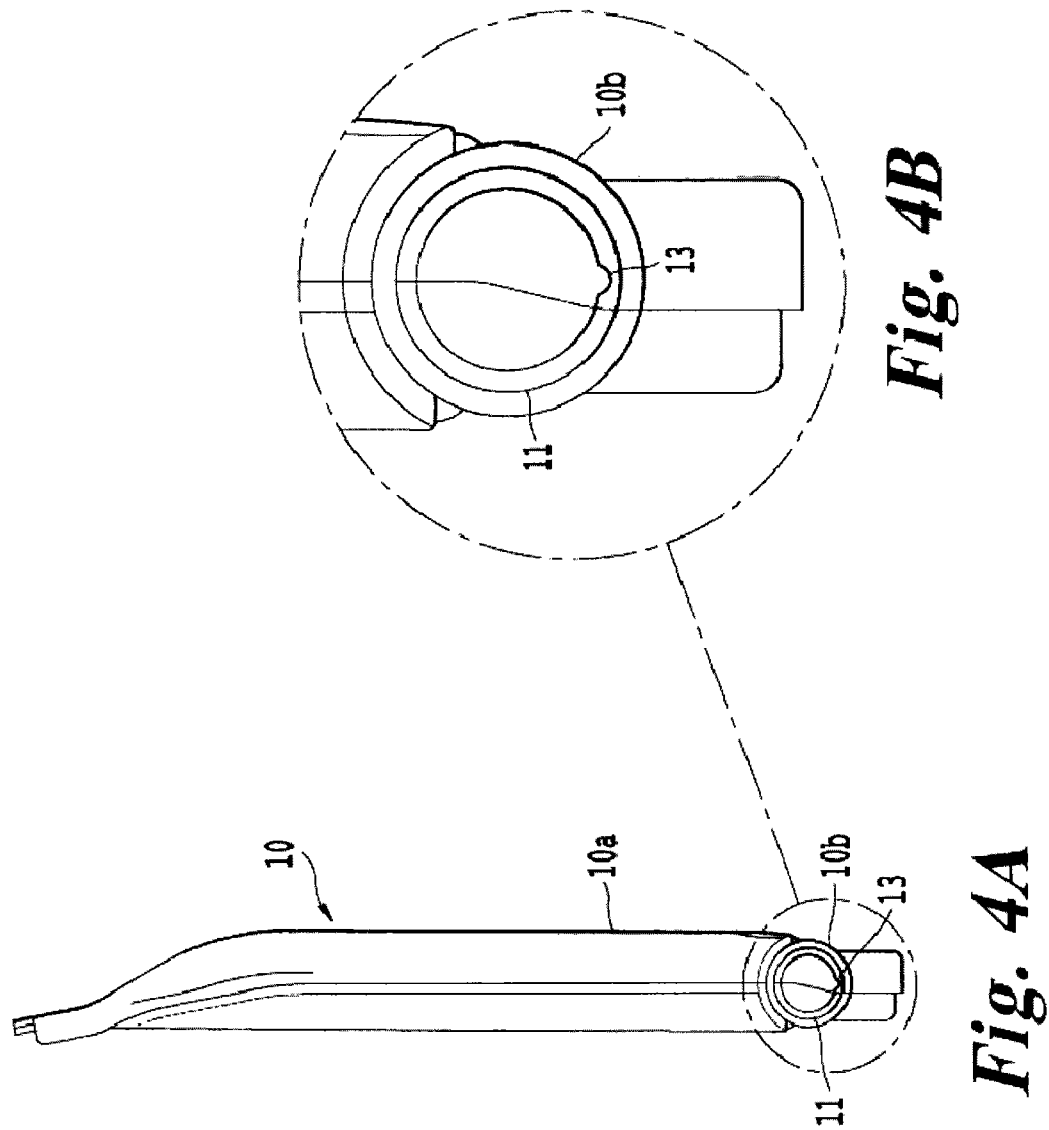

SUSPENSION CONTROL ARM WITH FRANGIBLE BUSHING COLLAR

BACKGROUND

Field of the Disclosure

The present disclosure relates to the placement of stress risers in automotive vehicle suspension arms to provide predictable suspension failure modes and movement of tire-and-wheel assemblies during offset frontal type collisions.

Description of the Related Art

Suspension arms locate the tire-and-wheel assembly in the vehicle and define the locus path of the tire-and-wheel assembly. During an offset frontal collision, the position and movement path of the front tire-and-wheel assembly during impact can influence both the crash energy load path and the intrusion amount into the passenger compartment.

SUMMARY

The present disclosure relates to a suspension arm adapted for use in a suspension system of an automotive vehicle, and more particularly to a suspension arm of the type which has a pair of spaced mounting portions mounted on a vehicle body structure at two positions and a support portion supporting thereon a tire-and-wheel assembly. By adding a frangible feature to the bushing collar of a suspension arm, a breakage mode and timing can be optimized to ensure that a tire-and-wheel assembly consistently contacts surrounding parts at the desired time and locations during a vehicle impact event.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is a side view of the suspension arm; and

FIG. 4B is an enlarged view of the side view of the suspension arm around a collar.

DETAILED DESCRIPTION OF THE EMBODIMENTS

Figure 1:
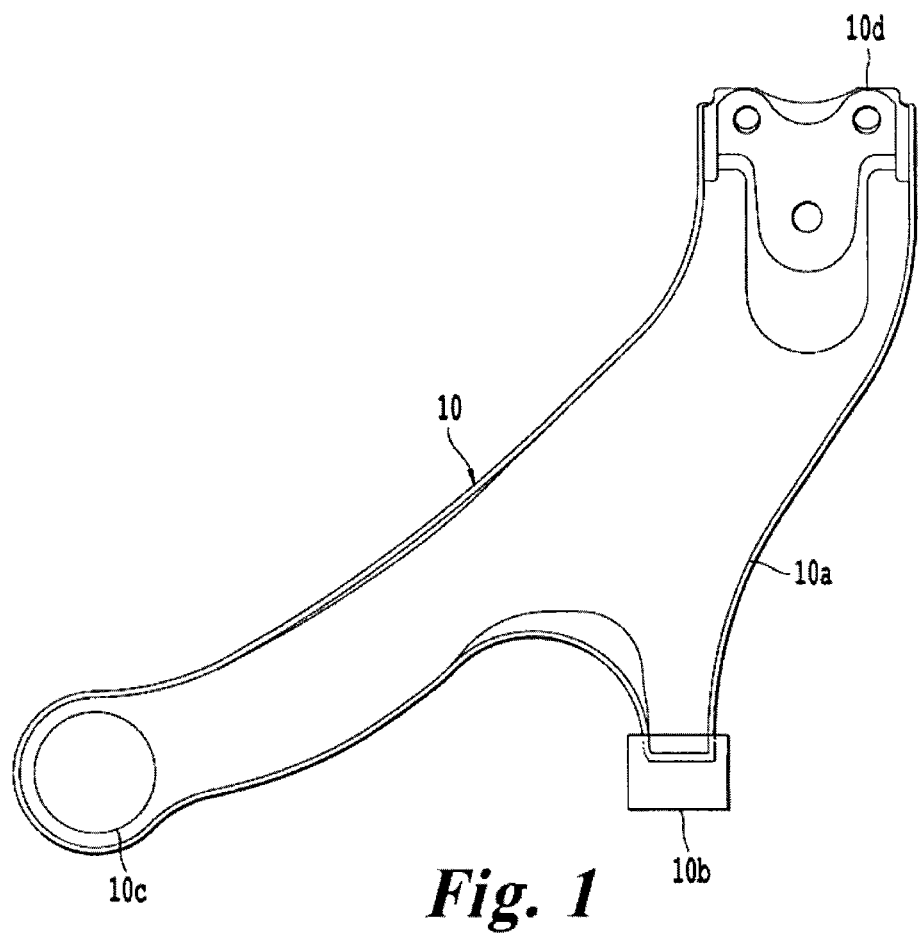
FIG. 1 is a plan view of a suspension arm.

FIG. 1 is a drawing of a preferred embodiment of a vehicle suspension arm assembly comprising a suspension arm 10 which has an arm member 10a formed in an approximate L-shape, a pair of spaced front and rear mounting portions 10b and 10c, and an outboard portion 10d.

Figure 2:
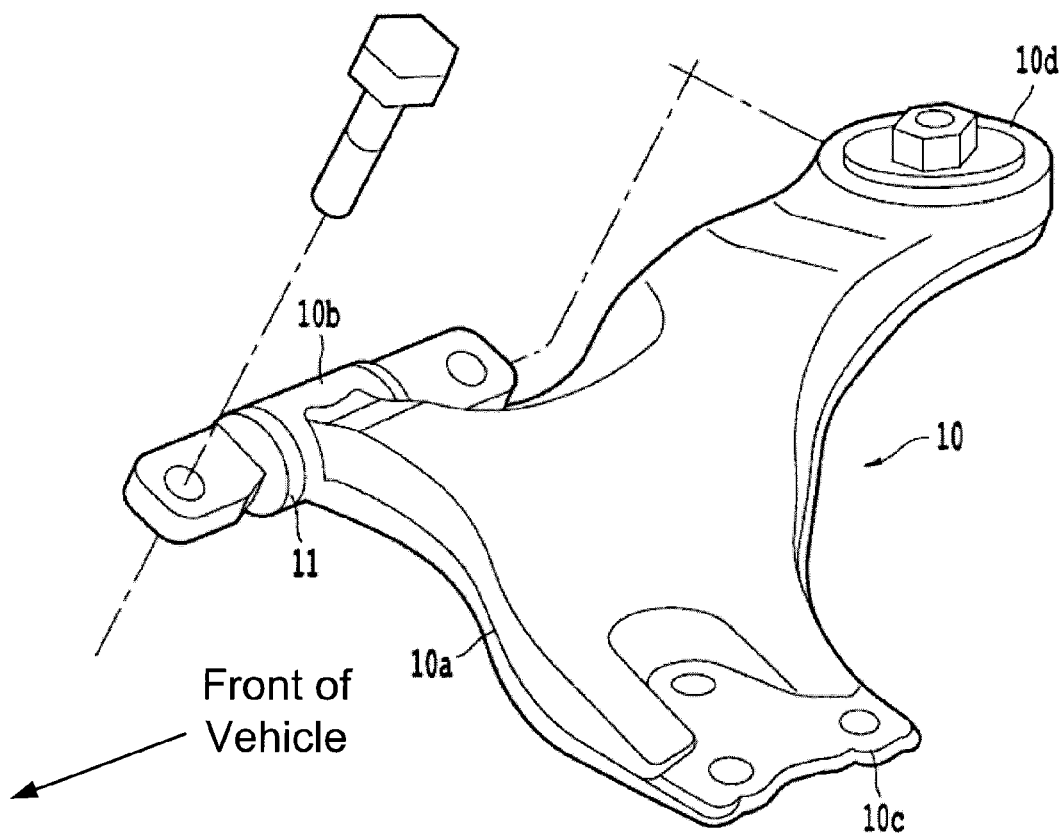
FIG. 2 is a schematic illustration of the suspension arm mounted on a vehicle.

As shown FIG. 2, the pair of spaced front and rear mounting portions 10b and 10c mounted on a vehicle body structure at two positions spaced in a first, fore-and-aft, direction of the vehicle, defined as an axis parallel to the longitudinal centerline of the vehicle, and an outboard portion 10d to support a tire-and-wheel assembly mounted thereon.

The front mounting portion 10b of suspension arm 10 is in the form of a cylindrical sleeve that is mounted on the vehicle through a bushing collar 11. The longitudinal axis of the bushing collar 11 is in the first direction. The front mounting portion 10b of suspension arm 10 is mounted on the vehicle for rotary movement about the longitudinal axis of the first direction. The rear mounting portion 10c of suspension arm 10 is in the form of the cylindrical sleeve that is mounted on the vehicle for rotary movement about an axis line orthogonal to the first direction, for example substantially in a vertical direction. The outboard portion 10d of the suspension arm 10 is connected to a carrier of a tire-and-wheel assembly by a ball joint in a usual manner. The suspension arm 10 can be formed by a variety of processes, for example casting or forging. The bushing collar 11 can be formed by a variety of processes, for example forging, welding, stamping, or extrusion. The material of the bushing collar 11 may have a different composition and hardness than the material of the suspension arm 10.

The bushing collar 11 of the front mounting portion 10b of the suspension arm 10 is equipped with a frangible portion. As used herein, the term "frangible portion" means structure intended to breakaway in an impact collision.

Figure 3:
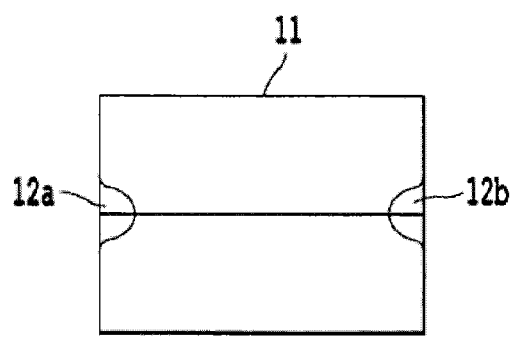
FIG. 3 is a side view of a notched bushing collar.

As shown in FIG. 3, the bushing collar 11 of the front mounting portion 10b of the suspension arm 10 is provided notches 12a and 12b. The first notch 12a is formed at the forward edge of the bushing collar 11. The second notch 12b is formed at the opposite edge of the first direction of the longitudinal axis of the bushing collar 11.

Notches 12a and 12b create stress risers and allow optimization of the breakage mode and breakage timing of the bushing collar 11 and front mounting portion 10b to ensure a tire-and-wheel assembly consistently contacts surrounding parts at desired times and locations, in a predictable sequence and manner, during a vehicle impact event.

Although the bushing collar 11 in the above-described embodiment is provided two notches 12a and 12b, it is obvious that said bushing collar 11 can be provided at least one notch.

As shown in FIGS. 4A and 4B, the bushing collar 11 of the front mounting portion 10b of the suspension arm 10 is provided an axial groove 13. The axial groove 13 is formed inside a circumference of the bushing collar 11. Also, the axial groove 13 is formed on a side of the bushing collar 11 furthest from the outboard portion 10d.

By adding axial groove 13 to the bushing collar 11 of the suspension arm 10, the breakage mode and breakage timing can be optimized to ensure a tire-and-wheel assembly consistently contacts surrounding parts at the desired time and locations, in a predictable sequence and manner, during a vehicle impact event.

Although in the above-described embodiment the axial groove 13 is formed inside a circumference of the bushing collar 11, it is obvious that the axial groove 13 can be formed outside circumference of said bushing collar 11. Also, it is obvious that the axial groove 13 can be formed on a side of the collar proximal from the arm member.

The invention claimed is:

1. A suspension arm adapted for use in a suspension system of an automotive vehicle comprising:
   an arm member;
   a first mounting portion formed at a first end of the arm member; and
   a second mounting portion formed at a second end of the arm member spaced in a first direction relative to the first mounting portion, wherein
   the first mounting portion includes a bushing collar provided with a frangible portion, and the longitudinal axis of the bushing collar is in the first direction,
   the bushing collar comprises a material of different hardness than a material of the arm member, and the frangible portion is a notch disposed on a first end of the bushing collar.

2. A suspension arm adapted for use in a suspension system of an automotive vehicle comprising:

an arm member;

a first mounting portion formed at a first end of the arm member; and a second mounting portion formed at a second end of the arm member spaced in a first direction relative to the first mounting portion, wherein the first mounting portion includes a bushing collar provided with a frangible portion, and the longitudinal axis of the bushing collar is in the first direction, the bushing collar comprises a material of different hardness than a material of the arm member, and the frangible portion is a groove disposed on a first end of the bushing collar.

* * * * *